March 24, 1964 K. REDDING 3,125,948
CLEANER BAR FOR UPPER BALER DRIVE ROLLER
Filed March 8, 1963 2 Sheets-Sheet 1

Keith Redding
INVENTOR.

BY
Attorneys

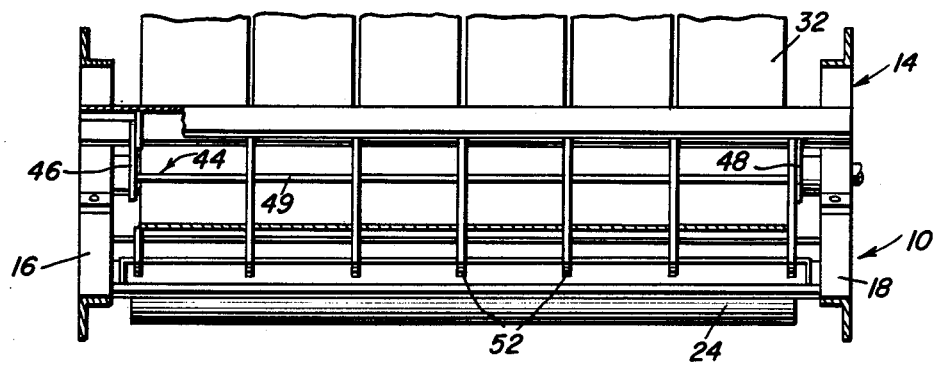
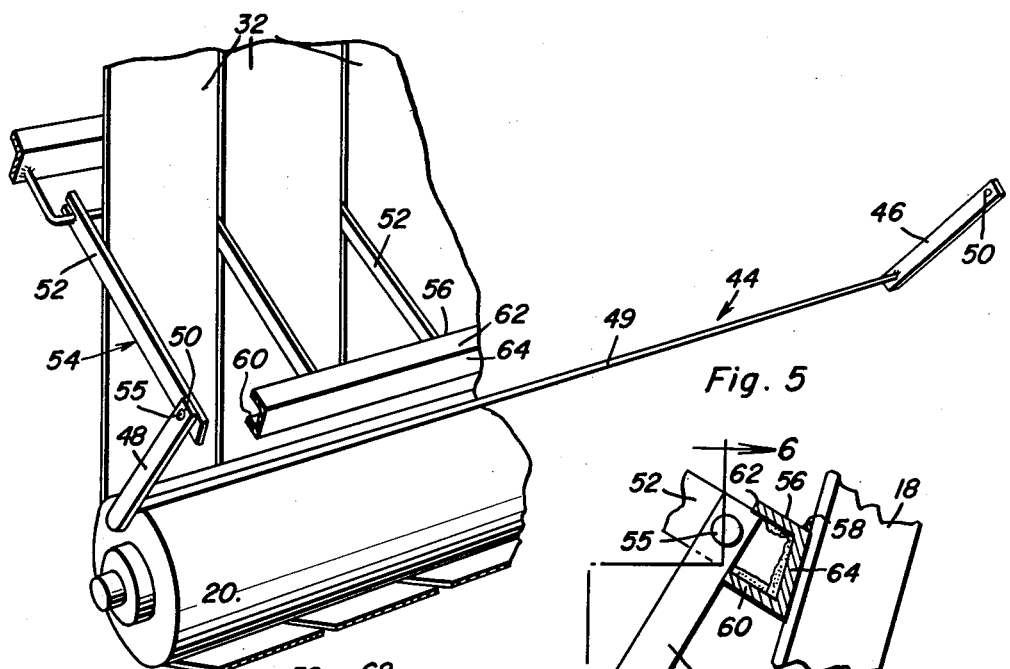
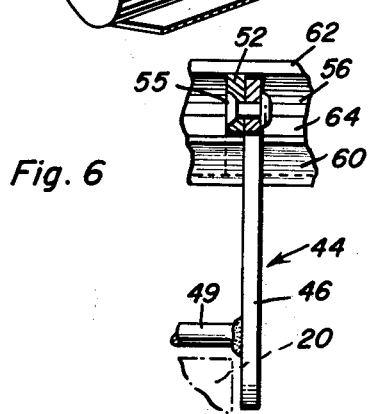

United States Patent Office 3,125,948
Patented Mar. 24, 1964

3,125,948
CLEANER BAR FOR UPPER BALER
DRIVE ROLLER
Keith Redding, Hamilton, Kans.
Filed Mar. 8, 1963, Ser. No. 263,900
2 Claims. (Cl. 100—88)

This invention relates to a novel and useful attachment for baling machines of the type designed to pick up windrows of bale material such as hay and roll the bale material into cylindrical or roll bales.

Baling machines of this type such as the "roto-baler" manufactured by the Allis-Chalmers Mfg. Co. are provided with elongated forwardly and downwardly inclined conveyors for picking up the windrows of hay and conveying the hay rearwardly between a pair of upper and lower spaced-apart and opposing drive rolls journaled from the frame of the "roto-baler" having upper and lower endless bands entrained thereabout and projecting rearwardly of the rolls in generally paralleling upper and lower reaches moving in opposite directions.

In some instances the bale material such as hay and the like has a tendency to wind about the upper drive roll of the baler and collect thereon. While this build-up of hay about the upper drive roll does not occur in all instances, there are conditions under which the build-up of hay about the upper drive roll is quite severe. In these instances, the operation of the baler must be intermittently terminated in order to enable the hay to be removed from the upper drive roll. Inasmuch as the rolls of the baler are constructed of rubber, the hay wound about the upper drive roll may not be readily cut therefrom because of possible damage to the upper drive roll and therefore, the hay wound about the upper drive roll must be hand-picked therefrom.

The hand-picking of hay from the upper drive roll of a baler of this type requires an appreciable length of time and accordingly, the time of effective operation of the machine and the men operating the machine is appreciably reduced.

It is accordingly therefore the main object of this invention to provide an attachment for a roll baler that may be readily secured to the baler in a manner such that the build-up of hay about the upper drive roller thereof will be substantially entirely eliminated.

A further object of this invention, in accordance with the preceding object, is to provide an attachment which may be readily secured to existing roll baling machines as well as readily incorporated into the manufacture of new baling machines.

Still another object of this invention is to provide an attachment in accordance with the preceding objects constructed in a manner whereby it may be readily attached to an existing roll baler.

A final object of this invention to be specifically enumerated herein is to provide an attachment which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a fragmentary horizontal sectional view taken substantially upon the plane indicated by the section line 3—3 of FIGURE 1;

FIGURE 4 is a fragmentary enlarged perspective view of one side of the baling machine showing the manner in which the attachment of the instant invention may be supported from the frame of the baling machine and operatively associated with the upper drive roller thereof;

FIGURE 5 is an enlarged fragmentary longitudinal vertical sectional view taken substantially upon a plane indicated by the section line 5—5 of FIGURE 2; and FIGURE 6 is a fragmentary sectional view taken substantially upon the plane indicated by the section line 6—6 of FIGURE 5.

Figure 1:
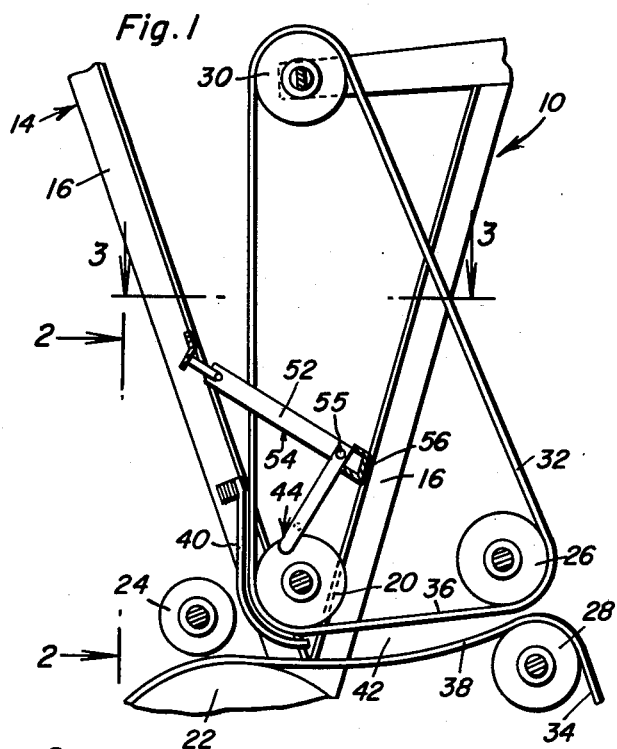
FIGURE 1 is a fragmentary longitudinal vertical sectional view taken substantially upon a plane passing through the longitudinal centerline of a roll baler showing the manner in which the attachment of the instant invention may be mounted from the frame of the baler and operatively associated with the upper drive roller thereof for preventing hay from winding about the upper drive roller.
Figure 2:
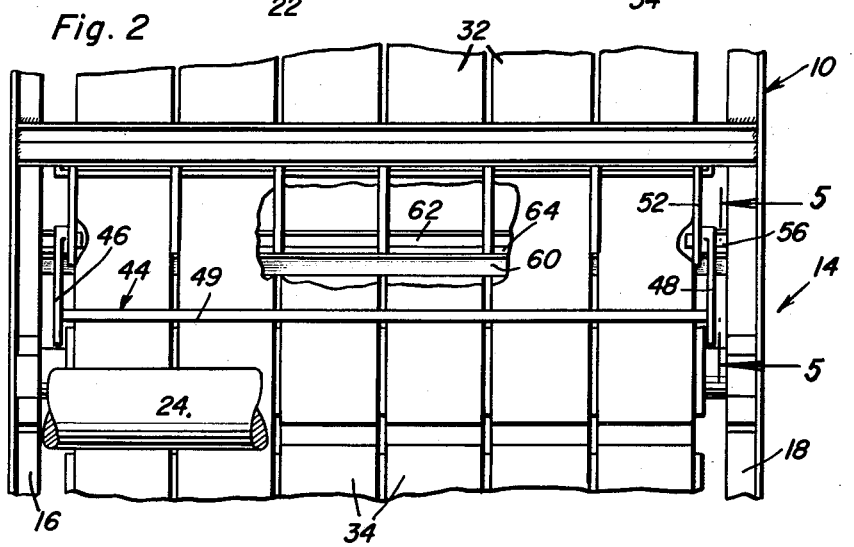
FIGURE 2 is a fragmentary end elevational view taken substantially upon a plane indicated by the section line 2—2 of FIGURE 1.

Referring now more specifically to the drawings the numeral 10 generally designates a conventional form of baling machine for forming rolled bales. The machine 10 includes a frame generally referred to by the reference numeral 14 and the frame 14 includes a pair of opposite side portions 16 and 18 which are substantially identical.

The machine 10 includes a pair of upper and lower drive rolls 20 and 22, a press roll 24, upper and lower trip rolls 26 and 28 and an upper tension roller 30. Although it is not shown, the machine 10 also includes a lower tension roller similar to roller 30. Entrained about the upper and lower rollers are upper and lower sets of endless bands 32 and 34 respectively. The bands 32 and 34 travel in a clockwise direction as viewed in FIGURE 1 of the drawing thereby providing two generally parallel and closely spaced reaches 36 and 38 of the bands 32 and 34, respectively, which move in opposite directions.

A guard 40 is supported from the frame 14 and extends beneath the forwardmost portion of the reaches 36 of the upper bands 32 thereby preventing that portion of the reaches 36 from coming into contact with the bale material being fed into the bale forming chamber 42 disposed between the reaches 36 and 38. The bale material is fed into the baling chamber 42 between the lower drive roll 22 and the press roll 24. As the sheet of matted bale material reaches a point between the upper and lower trip rollers 26 and 28, the free end of the sheet of baling material is rolled upwardly and backwardly after which the sheet of material fed between the press roll and the lower drive roll is rolled in a manner to form a large bale.

In some instances, the forwardly moving lower reaches 36 of the bands 32 have a tendency to catch pieces of hay therebetween and carry these caught pieces of hay to the upper drive roller 20 whereupon the caught hay winds about the upper drive roller 20. If this condition is not immediately corrected, an appreciable build-up of hay about the upper drive roller 20 will occur thus greatly hampering the operation of the machine 10.

The attachment of the instant invention may best be seen in FIGURES 1 and 4 of the drawings as generally designated by the reference numeral 44. The attachment 44 includes a pair of elongated and generally parallel arm members 46 and 48 which have an elongated bar 49 interconnected between one corresponding end portion thereof. The other pair of end portions of the arm members 46 and 48 are provided with suitable apertures 50 whereby the arm members may be pivotally secured to appropriate ones of the forwardly and upwardly inclined arms 52 of the upper band guide of the machine 10 which is generally referred to be the reference numeral 54 by means of suitable fasteners 55. The rearwardly and downwardly inclined ends of the arms 52 are fixedly secured in forwardly and upwardly opening channel members 56 secured between the opposite frame portions 16 and 18 in any convenient manner such as by welding 58. The channel member 56 includes a pair of flanges 60 and 62 interconnected by means of a bight portion 64. It will be noted that the free edge of the flange 60 abuts the underside of each of the arm members 48 in order to prevent further rotation of the arm members 48 in a counterclockwise direction as viewed in FIGURE 5 of the drawings and to position the elongated bar 49 approximately three-eighths of an inch above the upper periphery of the upper drive roller 20. Thus, the flange 60 defines a limit of swinging movement of the free ends of the arms 48 downwardly toward the upper drive roll 20. However, it may be seen that the elongated bar member 49 is spaced from the free ends of the arm members 46 and 48 and therefore that the free end portions of the arm members 46 and 48 embrace the opposite ends of the upper drive roll 20.

Because the arm members 46 and 48 are freely pivoted to the corresponding pair of arms or guides 52, the free forwardly and downwardly inclined end portions of the arm members 46 and 48 may be swung upwardly away from the upper drive roll 20. The positioning of the elongated bar 49 slightly above the upper peripheral portion of the upper drive roll 20 will prevent the bale material from winding about the upper drive roller 20.

The purpose of the bar 49 is not to catch the bale material passing around the drive roll 20, but to deflect this material in order that it may remain loose and pass outwardly through adjacent ones of the bands 32. By preventing a build-up of bale material on the drive roll 20 the possibility of the guard 40 being bent by such a build-up is eliminated. Further, the life of the bands 32 is increased as they will not be forced into contact with the guard 40 by a build-up of bale material on the drive roll 20. The proper spacing of the guard from the roll 20 is approximately one-eighth of an inch and it may be seen that this clearance could be altered appreciably in the event the guard 40 was bent by a build-up of bale material about the drive roll 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a roll-type baling machine having a frame and upper and lower spaced apart and opposing drive rolls journaled from said frame and having upper and lower endless bands entrained thereabout and projecting rearwardly of said rolls in generally paralleling upper and lower reaches moving in opposite directions, said frame including frame portions at opposite ends of said rolls, a cleaner bar attachment for preventing bale material from wrapping around said upper roll, said cleaner bar attachment comprising a pair of generally parallel arm members interconnected at one pair of corresponding end portions by means of an elongated bar member, means securing said other pair of corresponding end portions of said arm members to said frame portions with said elongated bar member disposed above and closely overlying the upper peripheral portion of said upper roll and generally paralleling the latter, said elongated bar member being spaced from the free ends of said one pair of end portions of said arm members and the portions of the free end portions of said arm members projecting beyond said bar member loosely embrace the opposite ends of said upper roll.

2. The combination of claim 1 wherein said free ends of said arm members are rounded so as not to define sharp terminal end portions on which bale material could become caught.

References Cited in the file of this patent

UNITED STATES PATENTS

| | | |
|---|---|---|
| 2,627,223 | Berge | Feb. 3, 1953 |
| 2,720,828 | Burns | Oct. 18, 1955 |
| 2,785,625 | Wiseman et al. | Mar. 19, 1957 |
| 2,975,700 | Stroburg et al. | Mar. 21, 1961 |